April 16, 1963  B. B. BLACKFORD  3,085,572
TAPE
Filed Oct. 6, 1961
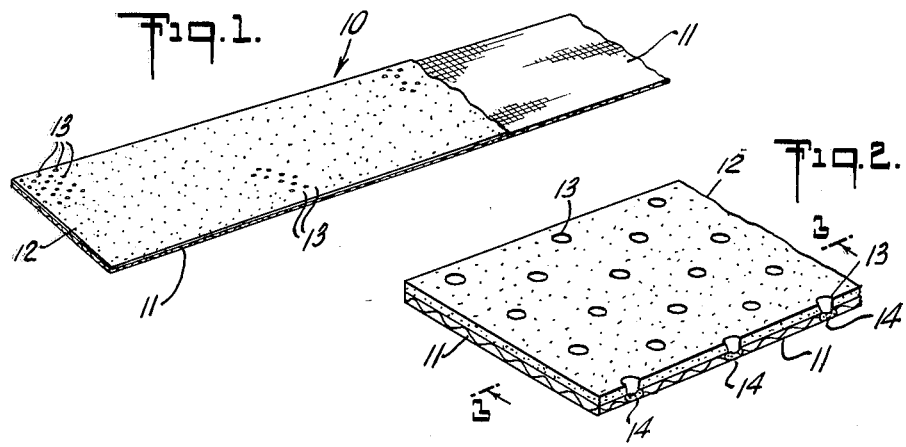
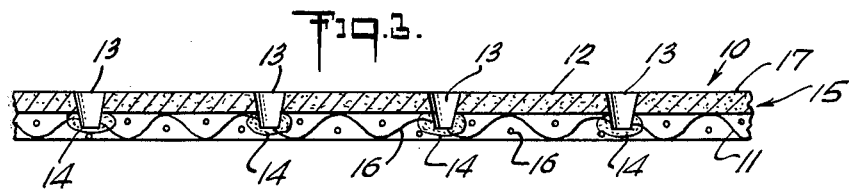
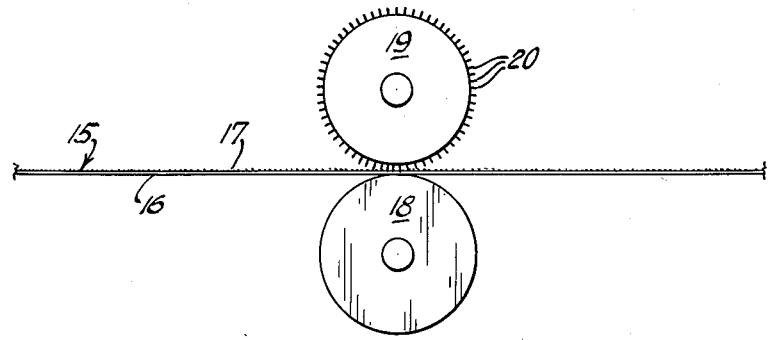
INVENTOR
BENJAMIN B. BLACKFORD
BY
ATTORNEY # omitted headers

3,085,572
TAPE

Benjamin B. Blackford, deceased, Metuchen, N.J., assignor to Johnson & Johnson, a corporation of New Jersey
Filed Oct. 6, 1961, Ser. No. 143,329
14 Claims. (Cl. 128—156)

The present invention relates to flexible, adhesive-coated sheet material and more particularly to pressure-sensitive adhesive-coated sheets, including adhesive tapes, and the method of making the same.

Adhesive tapes are generally sold in roll form and are used for numerous purposes wherein adherence of the tape to the skin of the patient is required. These tapes are used for securing on dressings, wrapping injured limbs, and for many other uses in which the tape is adhered through its adhesive-coated surface to a patient's skin. In using surgical tapes, it is frequently the practice to tear off strips of tape of the required length rather than using scissors or other cutting means which frequently are not immediately accessible. Accordingly, the ease with which a tape can be torn is an important factor with respect to its use, and ready or easy tear is a highly desirable characteristic in surgical adhesive tapes.

One of the difficulties in tearing tapes having woven fabric backings is that the warp threads near the edge of the tape do not always get broken during the tearing operation with the result that these threads unravel from the edge of the tape, leaving dangling threads both on the tape section that has been removed and on the tape remaining on the roll. These loose sections of tacky threads are extremely annoying. Adhesive tapes in which the woven fabric backing is of rayon are particularly difficult to tear in this manner without unraveling of the threads along the tape edge.

Another highly desirable quality in surgical adhesive tapes is to have the tape porous to permit the ready escape of moisture from the surface of the skin underlying the tape. Where the tape is not porous and the moisture cannot escape from the underlying skin, maceration of the skin may occur with resulting irritation to the skin under the tape, particularly where the tape remains on the skin for extended periods of time. Although it is highly desirable to have the tape porous to permit evaporation of moisture from the skin, openings made through the tape to permit such evaporation also act as openings through which dirt can pass. It is accordingly desirable to avoid large openings through the tape while at the same time obtaining a tape with a high moisture vapor transmission rate.

It is an object of the present invention to substantially reduce the degree of raveling in woven fabric-backed adhesive-coated sheets resulting from tearing the same. It is a still further object of the present invention to prepare pressure-sensitive adhesive-coated sheets having improved tear characteristics which are highly porous but which at the same time act to filter out most air-borne contamination.

Other objects and advantages of this invention will become apparent from the following description taken in connection with the accompanying drawings, wherein are set forth by way of illustration and examples certain embodiments of the invention.

It has now been discovered that adhesive tapes having substantially improved tear characteristics, wherein the backing of the tape is of woven fabric, are obtained if the pressure-sensitive adhesive coating of the tape is pressed into the fabric backing at a plurality of points distributed over the surface of the tape to provide what might be considered adhesive rivets in the woven fabric backing which act to bond together the threads of the backing at the points of adhesive penetration. This bonding of the fabric by the pressure-sensitive adhesive rivets, particularly near the edge of the tape, tends to anchor the threads within the woven fabric backing to each other. The presence of these adhesive rivets anchors the edge threads of the fabric to adjacent threads so that there is substantially less tendency for raveling to occur at the edge when the tape is torn into sections, the edge threads breaking more readily during the tearing operation. Furthermore, the tendency of edge threads to unravel during wearing of the tape is substantially reduced. This problem of raveling is particularly acute with fabric backings woven from synthetic yarns such, for example, as rayon.

These rivets of adhesive extending into the backing fabric are obtained, as hereinafter more fully described, by using a thermoplastic pressure-sensitive adhesive and pressing against the adhesive-coated surface of the fabric small heated projections which soften the adhesive and press the softened adhesive down into the backing fabric where it remains in the form of a hollow adhesive plug or pin, the hollow structure being caused by lateral flow of some of the adhesive as it is forced into the backing. These hollow adhesive plugs or pins are what is meant by the term "adhesive pin" in the present specifications and claims. Although the adhesive is pushed down into the fabric by the method used, microporous openings appear through the adhesive plug or rivet through which air and moisture vapor can pass from one side of the tape to the other. Probably, the reason for the microporous openings is that the adhesive, when forced into the fabric backing, tends to flow around the surface of the threads of the backing without completely filling the interstices within the threads, thus leaving small air passages which extend through the adhesive rivets while at the same time adhesively bonding together adjacent threads. Whatever the reason, the resulting tape is found to be highly permeable to air and has a high moisture vapor transmission rate, where a large number of small adhesive rivets are provided. At the same time, the tape so made is substantially impermeable to air-borne contamination because of the presence of adhesive in the fabric underlying the areas of perforation in the adhesive coating. Thus, a highly porous, adhesive-coated woven fabric of improved tear is obtained which also has a high moisture vapor transmission rate, while acting to filter out most air-borne contamination.

The invention is further described with reference to the drawings, wherein,

FIG. 1 is a perspective view of a section of adhesive tape of the present invention;

FIG. 2 is an enlarged view of a section of the tape of FIG. 1;

FIG. 3 is an enlarged, sectional view taken along line 3—3 of FIG. 2; and

FIG. 4 is a schematic view illustrating the formation of the adhesive rivets.

Referring to the drawings, the tape 10 comprises a woven fabric backing 11 having on one side thereof a pressure-sensitive adhesive coating 12. The adhesive coating 12 is pressed down into the fabric backing 11 over the surface of the tape, as indicated at depressions 13, forcing the adhesive down into the fabric backing in the form of small adhesive rivets 14. This is best illustrated in FIG. 3. The backing fabric is of a relatively close weave with very small interstices so that the adhesive plugs or rivets 14, even though small, will be pushed into the fabric and act to bond together adjacent threads. Fabrics having open interstices not larger than about .003 inch are accordingly generally preferred. Also, the area 13 of adhesive depression should be spaced sufficiently close together to provide the desired anchoring and improved tear characteristics. Accordingly, the depressions 13 should preferably be no more than about 0.080 inch from each other. These depressions may vary in size from about .001 to about .015 inch in diameter, it generally being preferred to form depressions, where circular, of diameter of about .003 to .006 inch. Although in the drawings the depressions have been shown as circular, the depressed area may take any shape, form or pattern and may, for example, be in the form of squares, diamonds, short lines or the like. As most adhesive tapes are formed by slitting adhesive-coated sheets of substantially greater width than the final tape, the pattern of the depressed adhesive areas should preferably be such that the adhesive pressed into the fabric backing will at some point contact each of the threads from which the fabric is woven so that there will not be threads on the selvage edge after slitting which are not bonded at spaced intervals of less than about ¼ inch, bonding distances of less than .1 inch being preferred.

The total depressed area of the adhesive may be as great as 60% of the adhesive surface, the preferred generally being about 2 to 12% of the adhesive spread surface. If too much of the adhesive is pressed into the fabric backing, there may not be sufficient adhesive area remaining to obtain the desired adherence to the patient's skin. Accordingly, the depressed area should generally not exceed more than about 6% of the adhesive surface. Also, care should be taken that the adhesive is not pressed through the backing so as to make the back of the tape tacky.

Fabrics woven from cellulosic synthetic fibers, such as regenerated cellulose and cellulose acetate, however, have an excellent appearance and tend to soil much less readily than the conventional cotton fabrics used in making tape backings. Also, fabrics formed of synthetic cellulose fibers, such, for example, as rayon fabric, when coated with a pressure-sensitive adhesive can be torn more easily than woven cotton fabric of equal weight. However, despite these advantages of rayon fabric for use as backings for pressure-sensitive adhesive tapes, rayon and other synthetic cellulosic fiber woven fabrics are generally considered to be unsatisfactory for surgical tapes and, insofar as we are aware, are not presently used in this country.

The primary objection to rayon as a backing for pressure-sensitive adhesive surgical tapes has been its poor performance under any conditions where the tape may become wetted during use. A rayon-backed surgical tape where coated with the conventional rubber-based pressure-sensitive adhesive of the type generally used in surgical adhesive tapes unless specially treated is found to delaminate badly when once the tape has been wetted, the adhesive separating from the rayon backing and adhering to the skin of the patient when attempts are made to remove the tape.

It has been found that rayon fabric backings can be used in surgical tapes and tapes having excellent adherence of the adhesive to the rayon fabric backing obtained even after the tape has been thoroughly wetted if the pressure-sensitive adhesive mass used is of the acrylate type. These pressure-sensitive adhesive acrylates generally being polymers of alcohol esters of acrylic acid or the copolymers of these esters either with each other or with additive copolymerizable monomers having strongly polar groups. Accordingly, one preferred manner in which the present invention is practical is to use in combination with a woven rayon or other woven fabric backing of synthetic cellulosic yarn a pressure-sensitive adhesive acrylate mass.

When tapes are made in accordance with the present invention using pressure-sensitive adhesive masses which are somewhat hydrophilic in nature, such, for example, as pressure-sensitive acrylate polymers and copolymers, it is found that not only moisture vapor but actual liquid, such as perspiration, is readily wicked through the depressed acrylate adhesive plugs or rivets 14 passing into the fabric backing where, when the fabric itself is absorbent, the liquid can spread laterally for rapid evaporation. This is not found to occur with the conventional rubber-base pressure-sensitive surgical adhesive masses. This wicking action through the adhesive surface of the tape to the tape backing is obtained with pressure-sensitive acrylate masses even where the depressed areas are quite small in diameter, this effect being obtained with depressed areas of diameter no greater than about .002 inch. A tape having excellent moisture and liquid transfer from the skin surface can accordingly be obtained with very small diameter depressions which are hardly visible to the naked eye, a large number of such depressed areas being provided, spaced close together, over the adhesive surface of the tape. With a tape made in this manner, substantially the entire skin surface under the tape is either under or immediately adjacent to a vented section through which moisture can escape.

In preparing tapes of the present invention, the tape backing 11 is first coated with a thermoplastic pressure-sensitive adhesive mass 12 by any conventional means, such as by calendering the mass on the fabric backing, by spreading the adhesive on the fabric by means of a doctor blade or by any other suitable technique. The adhesive coating is then pressed into the main body of the fabric backing at spaced intervals to provide the adhesive rivets 14. Referring to FIG. 4 of the drawings, this may be done by passing an adhesive-coated fabric 15 formed of a backing fabric 16 and an adhesive coating 17 between two rolls 18 and 19. Roll 18, which acts as a supporting roll, is provided with a hard, smooth surface which is adapted to contact the uncoated side of the fabric backing 16. The other roll 19 is provided with a plurality of blunt projections 20 which press against the adhesive coating 17. These projections 20 are preferably heated, by heating roll 19, to a temperature of about 280° to 400° F. The backing roll is chilled, as for example, by circulating cooling water therethrough. By cooling the backing roll, the adhesive, softened by the heated projections 20 and pressed into the fabric 16, is prevented from passing completely through the fabric backing and making the back of the pressure-sensitive adhesive-coated sheet tacky.

The following example is given to help further illustrate the invention. The example is for the purpose of illustration only and the invention is not limited thereto.

*Example*

A rayon fabric formed of 150 denier yarns and having 108 warp and 56 weft threads to the inch is calender spread with a pressure-sensitive adhesive mass. The pressure-sensitive adhesive is a rubber-base surgical adhesive of the conventional type containing natural rubber, stabilized rosin, lanolin, zinc oxide, cornstarch and antioxidants. A similar fabric is spread with an acrylate copolymer formed through the copolymerization of 3 parts by weight 2-ethylhexyl acrylate with 2 parts by weight vinyl acetate and having a Williams plasticity of 1.70 mm. Sections of both fabrics are then passed between two rolls, the bottom roll formed of cast iron and having a hard, smooth surface. The top roll has a plurality of projections extending from its surface, each having a diameter of 0.006 inch, the projections being spaced 16 to the inch. The top roll is heated to a temperature of 350° F. The adhesive-coated fabrics are passed between these rolls with the adhesive-coated sides facing the roll with the heated projections, the rolls turning at the same speed as the linear speed of the fabrics. The fabrics as they pass between the rolls have the adhesive forced down into the surface of the fabrics at the points where the projections contact the adhesive surface, forming within the fabrics the adhesive rivets heretofore referred to. The fabrics thus treated have a total adhesive depressed area of 5%. The adhesive-coated sheets with the adhesive rivets formed therein are then slit into tape strips of 2 inches. Sections of the adhesive-coated sheets which have not been passed between the two rolls are also slit into tape strips of 2 inches. On tear tests made on these strips, it is found that the fabrics in which the adhesive rivets have been formed tear with substantially less fraying at the edge of the fabric than those which have not been passed under the adhesive depressing roll.

Ink is spilled onto a smooth surface and the tapes, that is, the tape with the rubber-base surgical adhesive coating with adhesive rivets formed therein and the tape with the acrylate pressure-sensitive adhesive coating with adhesive rivets formed therein, are placed with adhesive mass down over the spilled ink. The ink rapidly passes through the tape having the acrylate pressure-sensitive adhesive mass and spreads out laterally over the absorbent fabric backing. There is substantially little penetration of the liquid ink, however, through the tape containing the conventional rubber-base pressure-sensitive adhesive mass. The moisture vapor transmission rate of the tape with the depressed rubber-base pressure-sensitive adhesive is 185 gr./100 sq. in./24 hrs. The moisture vapor transmission rate of the tape with the depressed acrylate pressure-sensitive adhesive is 200 gr./100 sq. in./24 hrs.

The invention is susceptible of many modifications within its spirit and accordingly is to be limited only by the scope of the appended claims.

Having thus described my invention, I claim:

1. A woven fabric-backed pressure-sensitive adhesive tape having improved tear characteristics comprising a woven fabric backing, a perforated pressure-sensitive adhesive coating on one surface of said backing, pressure-sensitive adhesive rivets in said fabric backing adjacent the perforations in said adhesive coating, said adhesive rivets being distributed throughout said backing including the edges thereof, and extending from said adhesive-coated surface down into the main body of said fabric backing, said adhesive rivets being porous and acting to filter air passing through said tape through the perforations in said adhesive coating, said adhesive rivets also acting to bond together adjacent threads in said woven fabric backing and inhibiting unraveling of threads of said tape when said tape is torn.

2. A tape of claim 1 in which said pressure-sensitive adhesive is a pressure-sensitive acrylate adhesive.

3. A woven fabric-backed pressure-sensitive adhesive tape of claim 1 in which the woven fabric backing is formed of synthetic fibers.

4. A woven fabric-backed pressure-sensitive adhesive tape of claim 3 in which the woven fabric backing is a rayon fabric.

5. A tape of claim 4 in which said pressure-sensitive adhesive is an acrylate adhesive.

6. A porous woven fabric-backed pressure-sensitive adhesive tape having improved tear characteristics comprising a woven fabric backing, a pressure-sensitive adhesive coating on one surface of said fabric backing, pressure-sensitive adhesive rivets extending from said adhesive-coated surface down into the main body of said fabric backing, said adhesive rivets being spaced no more than about 0.08 inch from each other and acting to bond together adjacent threads of said backing at points spaced not more than about ¼ inch from each other along a thread.

7. A tape of claim 6 in which said pressure-sensitive adhesive is a pressure-sensitive acrylate adhesive.

8. A porous woven fabric-backed pressure-sensitive adhesive tape of claim 6 in which said fabric backing is formed of synthetic fibers.

9. A pressure-sensitive tape of claim 8 in which said backing is formed of rayon.

10. A pressure-sensitive adhesive tape of claim 9 in which the pressure-sensitive adhesive coating is an acrylate resin base adhesive.

11. A pressure-sensitive adhesive tape of claim 6 in which 2 to 60% of the pressure-sensitive adhesive-coated surface is pressed down into the woven fabric backing of the tape.

12. A pressure-sensitive adhesive tape of claim 11 in which the openings in the pressure-sensitive adhesive coating, remaining from the adhesive in the open areas having been pressed down into the fabric backing, are not substantially larger in area than a circle having a diameter of about .015 inch.

13. A porous woven fabric-backed pressure-sensitive tape having improved tear characteristics comprising a woven fabric backing having an average interstice between threads of not substantially over .003 inch, a pressure-sensitive adhesive coating on one surface of said fabric backing, individual depressions in said coating with pressure-sensitive adhesive rivets extending from the base of said depressions down into the main body of said fabric backing, said depressions being in cross-sectional area not substantially greater than the area of a circle having a diameter of about .015 inch, said adhesive rivets being spaced no more than about .08 inch from each other and acting to bond together adjacent threads of said backing at points spaced not more than about ¼ inch from each other along a thread.

14. A pressure-sensitive adhesive tape of claim 13 in which the woven fabric backing is a rayon fabric and the pressure-sensitive adhesive in an acrylate polymer base adhesive.

No references cited.